(12) United States Patent
Das et al.

(10) Patent No.: US 11,009,892 B2
(45) Date of Patent: May 18, 2021

(54) ACTIVE HUMAN-MACHINE USER INTERFACE FEEDBACK SYSTEM WITH SPHERICAL MOTOR

(71) Applicant: HONEYWELL INTERNATIONAL INC., Morris Plains, NJ (US)

(72) Inventors: Shouvik Das, Madurai (IN); Pablo Bandera, Avondale, AZ (US); Deena Dayalan Kothandaraman, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 248 days.

(21) Appl. No.: 16/358,409

(22) Filed: Mar. 19, 2019

(65) Prior Publication Data

US 2020/0301447 A1    Sep. 24, 2020

(51) Int. Cl.
*G05D 1/08* (2006.01)
*G06F 3/01* (2006.01)
*G05G 5/03* (2008.04)
*B64C 13/04* (2006.01)
*G05G 1/04* (2006.01)

(52) U.S. Cl.
CPC ....... *G05D 1/0808* (2013.01); *B64C 13/0421* (2018.01); *G05G 1/04* (2013.01); *G05G 5/03* (2013.01); *G06F 3/016* (2013.01); *G05G 2505/00* (2013.01)

(58) Field of Classification Search
CPC .... G05D 1/0808; B64C 13/0421; G05G 1/04; G05G 5/03; G05G 2505/00; G06F 3/016
USPC .......................................................... 701/11
See application file for complete search history.

(56) References Cited

U.S. PATENT DOCUMENTS

| | | |
|---|---|---|
| 5,559,432 A | 9/1996 | Logue |
| 5,831,554 A | 11/1998 | Hedayat et al. |
| 7,394,173 B2 | 7/2008 | Cope et al. |
| 7,658,349 B2 | 2/2010 | Abel et al. |
| 7,759,894 B2 | 7/2010 | Marino et al. |
| 9,122,309 B2 | 9/2015 | Hanlon et al. |

(Continued)

FOREIGN PATENT DOCUMENTS

CN    107181339 A    9/2017

OTHER PUBLICATIONS

Corcoran, C., et al.; Direct-Drive Force-Feedback Joystick; Research gate.

*Primary Examiner* — Gertrude Arthur Jeanglaude
(74) *Attorney, Agent, or Firm* — Lorenz & Kopf, LLP

(57) ABSTRACT

An active human-machine interface feedback system includes a user interface, a pitch angle sensor, a roll angle sensor, a spherical motor, and a control circuit. The user interface adapted to receive user input and is configured, upon receipt of the user input, to move, about one or both of a pitch axis and a roll axis, to a user interface position. The pitch angle sensor is configured to sense the pitch angle component of the user interface position. The roll angle sensor is configured to sense the roll angle component of the user interface position. The spherical motor is coupled to the user interface and is symmetrically disposed about the origin. The control circuit determines a polar angle (θ) of the user interface relative to the origin, determine an azimuthal angle (φ) of the user interface relative to the origin, and supply current to the first, second, and third coils.

20 Claims, 4 Drawing Sheets

(56) References Cited

U.S. PATENT DOCUMENTS

| | | |
|---|---|---|
| 9,893,574 B2 | 2/2018 | Bandera |
| 2004/0124717 A1 | 7/2004 | Corcoran et al. |
| 2012/0281330 A1* | 11/2012 | Abbott .................. A61B 34/70 361/143 |
| 2015/0057676 A1* | 2/2015 | Muntwyler ............ A61B 34/70 606/130 |
| 2016/0018843 A1 | 1/2016 | Lopez |

* cited by examiner

ACTIVE HUMAN-MACHINE USER INTERFACE FEEDBACK SYSTEM WITH SPHERICAL MOTOR

TECHNICAL FIELD

The present invention generally relates to human-machine interfaces, and more particularly relates to an active human-machine interface feedback system that includes a spherical motor.

BACKGROUND

Human-machine interfaces are used in myriad industries to translate human movements to machine movements. For example, some aircraft flight control systems include a human-machine interface in the form of a control stick, sometimes referred to as a side stick. The flight control system, in response to input forces supplied to the human-machine interface from the user (e.g., the pilot), controls the movements of various aircraft flight control surfaces.

No matter the specific end-use system, the human-machine interface preferably includes some type of active (or haptic) feedback mechanism back through the interface to the interface operator. In most instances, the feedback mechanism is relatively complicated, employing several actuation and sensing devices that, in some cases must also meet certain accuracy and redundancy standards in order to meet specified safety and reliability requirements. This can increase cost, weight, and overall space envelope.

For example, an aircraft side stick is typically configured to be moveable about two perpendicular axes—a pitch axis and a roll axis. Thus, an active aircraft side stick may include two pair of motors, one pair associated with the pitch axis, and another pair associated with the roll axis. The motors may be coupled to the side stick via a combination of cranks and/or gears, which can further increase the cost, space-envelope, and weight. Even if the motors are configured to directly drive the side stick, the motors must still be connected using some sort of universal joint to mechanically decouple each axis of motion, which still increases costs, weight, and system space envelope.

Hence, there is a need for an active human-machine interface that is moveable about at least two perpendicular axes and that is less costly, lower in weight, and exhibits a smaller space envelope, as compared to known human-machine interfaces. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an active human-machine interface feedback system includes a user interface, a pitch angle sensor, a roll angle sensor, a spherical motor, and a control circuit. The user interface adapted to receive user input and is configured, upon receipt of the user input, to move, about one or both of a pitch axis and a roll axis, to a user interface position. The user interface position has one or both of a pitch angle component and a roll angle component, wherein the pitch axis and the roll axis are disposed perpendicular to each other and intersect at an origin. The pitch angle sensor is coupled to the user interface and is configured to sense the pitch angle component of the user interface position and to supply a pitch angle signal representative of the user interface pitch angle component. The roll angle sensor is coupled to the user interface and is configured to sense the roll angle component of the user interface position and to supply a roll angle signal representative of the user interface roll angle component. The spherical motor is coupled to the user interface and is symmetrically disposed about the origin. The spherical motor includes an armature, a spherical stator, a first coil, a second coil, and a third coil. The armature coupled to the user interface. The spherical stator has a first axis of symmetry, a second axis of symmetry, a third axis of symmetry that are disposed perpendicular to each other. The first coil, the second coil, and the third coil are wound on the spherical stator about the first axis of symmetry, the second axis of symmetry, and the third axis of symmetry, respectively. The control circuit is coupled to receive the pitch angle signal and the roll angle signal and is operable, in response to at least these signals, to: determine a polar angle ($\theta$) of the user interface relative to the origin, determine an azimuthal angle ($\varphi$) of the user interface relative to the origin, supply current to the first coil that is equal to $I_0*\sin(\theta)*\cos(\varphi)$, supply current to the second coil that is equal to $I_0*\sin(\theta)*\sin(\varphi)$, and supply current to the third coil that is equal to $I_0*\sin(\theta)$, wherein $I_0$ is a current vector magnitude value.

In another embodiment, an active human-machine interface feedback system includes a user interface, a pitch angle sensor, a roll angle sensor, a spherical motor, and a control circuit. The user interface adapted to receive user input and is configured, upon receipt of the user input, to move, about one or both of a pitch axis and a roll axis, to a user interface position. The user interface position has one or both of a pitch angle component and a roll angle component, wherein the pitch axis and the roll axis are disposed perpendicular to each other and intersect at an origin. The pitch angle sensor is coupled to the user interface and is configured to sense the pitch angle component of the user interface position and to supply a pitch angle signal representative of the user interface pitch angle component. The roll angle sensor is coupled to the user interface and is configured to sense the roll angle component of the user interface position and to supply a roll angle signal representative of the user interface roll angle component. The spherical motor is coupled to the user interface and is symmetrically disposed about the origin. The spherical motor includes an armature, a spherical stator, a first coil, a second coil, and a third coil. The armature coupled to the user interface. The spherical stator has a first axis of symmetry, a second axis of symmetry, a third axis of symmetry that are disposed perpendicular to each other. The first coil, the second coil, and the third coil are wound on the spherical stator about the first axis of symmetry, the second axis of symmetry, and the third axis of symmetry, respectively. The control circuit is coupled to receive the pitch angle signal and the roll angle signal and is operable, in response to at least these signals, to: determine a polar angle ($\theta$) of the user interface relative to the origin, determine an azimuthal angle ($\varphi$) of the user interface relative to the origin, supply current to the first coil that is equal to $I_0*\sin(\theta)*\cos(\varphi)$, supply current to the second coil that is equal to $I_0*\sin(\theta)*\sin(\varphi)$, and supply current to the third coil that is equal to $I_0*\sin(\theta)$, wherein $I_0$ is a variable current vector magnitude value.

In yet another embodiment, an active human-machine interface feedback system includes a user interface, a pitch angle sensor, a roll angle sensor, a spherical motor, and a control circuit. The user interface adapted to receive user input and is configured, upon receipt of the user input, to move, about one or both of a pitch axis and a roll axis, to a user interface position. The user interface position has one or both of a pitch angle component and a roll angle component, wherein the pitch axis and the roll axis are disposed perpendicular to each other and intersect at an origin. The pitch angle sensor is coupled to the user interface and is configured to sense the pitch angle component of the user interface position and to supply a pitch angle signal representative of the user interface pitch angle component. The roll angle sensor is coupled to the user interface and is configured to sense the roll angle component of the user interface position and to supply a roll angle signal representative of the user interface roll angle component. The spherical motor is coupled to the user interface and is symmetrically disposed about the origin. The spherical motor includes an armature, a spherical stator, a first coil, a second coil, and a third coil. The armature coupled to the user interface. The spherical stator has a first axis of symmetry, a second axis of symmetry, a third axis of symmetry that are disposed perpendicular to each other. The first coil, the second coil, and the third coil are wound on the spherical stator about the first axis of symmetry, the second axis of symmetry, and the third axis of symmetry, respectively. The control circuit is coupled to receive the pitch angle signal and the roll angle signal and is operable, in response to at least these signals, to: determine a polar angle ($\theta$) of the user interface relative to the origin, determine an azimuthal angle ($\varphi$) of the user interface relative to the origin, supply current to the first coil that is equal to $I_0*\sin(\theta)*\cos(\varphi)$, supply current to the second coil that is equal to $I_0*\sin(\theta)*\sin(\varphi)$, and supply current to the third coil that is equal to $I_0*\sin(\theta)$, wherein $I_0$ is a current vector magnitude value. $I_0$ is a variable current vector magnitude value, and the control circuit is further configured to vary the current vector magnitude value ($I_0$) in response to the polar angle ($\theta$) and the azimuthal angle ($\varphi$).

Furthermore, other desirable features and characteristics of the active human-machine interface feedback system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
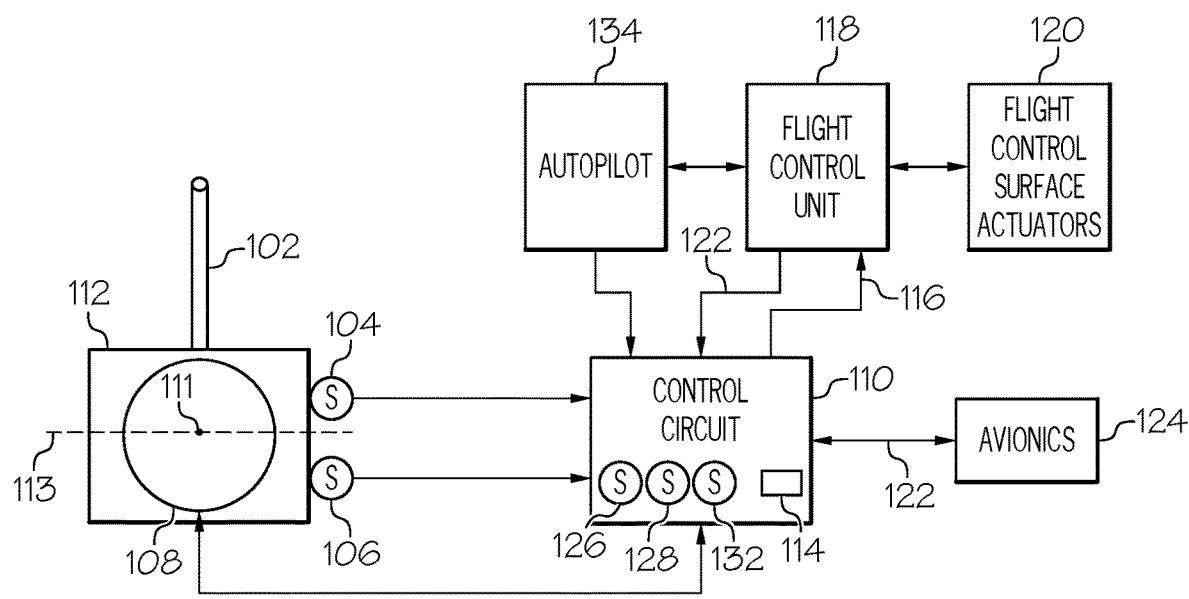
FIG. 1 depicts a functional block diagram of one embodiment of an active human-machine interface system.

Turning first to FIG. 1, a functional block diagram of one embodiment of an active human-machine interface system 100 is depicted. The system 100 includes a user interface 102, a pitch angle sensor 104, a roll angle sensor 106, a spherical motor 108, and a control circuit 110. The user interface 102 is adapted to receive user input and is configured, upon receipt of the user input, to move to a user interface position. More specifically, it is configured to move to a plurality of user interface positions in a plurality of directions. To facilitate this functionality, the user interface 102, at least in the depicted embodiment, is coupled to a gimbal assembly 112.

The gimbal assembly 112 is configured to allow the user interface 102 to be moved from a null position, which is the position depicted in FIG. 1, to the plurality of user interface positions in the plurality of directions. More specifically, the gimbal assembly 112, in response to the user input supplied to the user interface 102, allows the user interface 102 to be moved from the null position to a plurality of user interface positions, about two perpendicular rotational axes—a first rotational axis 111 and a second rotational axis 113—that intersect at an origin 202 (see FIG. 2). It will be appreciated that the first and second rotational axes 111, 113 are also referred to herein as the roll axis 111 and the pitch axis 113, respectively.

Figure 2:
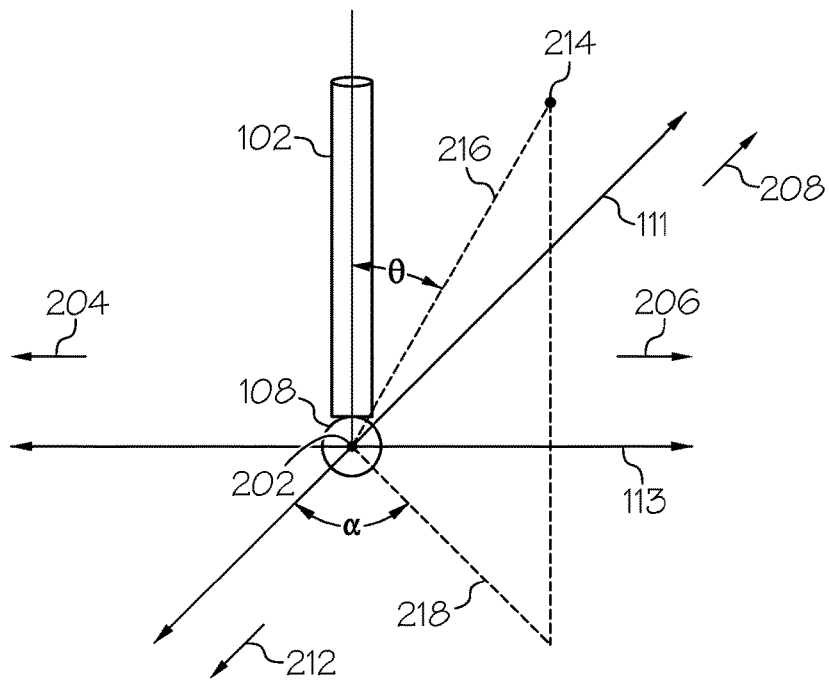
FIG. 2 graphically depicts the movement of the user interface of the system of FIG. 1 about two orthogonal axes.

As FIG. 2 illustrates more clearly, the gimbal assembly 112 is additionally configured to allow the user interface 102 to be movable about the roll axis 111 in a port direction 202 and a starboard direction 204, and about the pitch axis 113 in a forward direction 208 and an aft direction 212. It will additionally be appreciated that the gimbal assembly 112 is configured to allow the user interface 102 to be simultaneously rotated about the roll and pitch axes 111, 113 to move the user interface 102 in a combined forward-port direction, a combined forward-starboard direction, a combined aft-port direction, or a combined aft-starboard direction, and back to or through the null position. Thus, as FIG. 2 further depicts, the user interface 102 is configured, upon receipt of user input, to move, about one or both of the roll axis 111 and pitch axis 113, to a user interface position 214 that has one or both of a pitch angle component 216 and a roll angle component 218, and thus has one or both of a polar angle ($\theta$) and an azimuthal angle ($\varphi$).

The pitch angle sensor 106 and the roll angle sensor 108 are both coupled to the user interface 102. The pitch angle sensor 106 is configured to sense the pitch angle component of the user interface position, and to supply a pitch angle signal representative of the user interface pitch angle component. The roll angle sensor 108 is configured to sense the roll angle component of the user interface position, and to supply a roll angle signal representative of the user interface roll angle component. It will be appreciated that the pitch angle sensor 106 and the roll angle sensor 108 may be implemented using any one of numerous known types of angular position sensors. Some non-limiting examples include any one of numerous RVDTs, LVDTs, potentiometers, optical sensors, hall effect sensors and magneto resistive sensors. It will additionally be appreciated that the pitch angle sensor 106 and the roll angle sensor 108 may be coupled directly to the user interface 102, or indirectly to the user interface 102 via the gimbal assembly 112.

The spherical motor 112 is coupled to the user interface 102 and is symmetrically disposed about the origin 109. The spherical motor 102, an embodiment of which is depicted more clearly in FIG. 3, includes a spherical stator 302, an armature 304, and a plurality of magnets 306. The spherical stator 302, as this term implies, is spherically shaped, and thus has three perpendicularly disposed axes of symmetry 308—a first axis of symmetry 308-1, a second axis of symmetry 308-2, and a third axis of symmetry 308-3. In the depicted embodiment, the first axis of symmetry 308-1 coincides with the roll axis 111 and the second axis of symmetry 308-2 coincides with the pitch axis 113. Preferably, the spherical stator 302 is fixedly mounted, via suitable mounting hardware, to the gimbal assembly 112 (not shown in FIG. 3).

The armature 304 is spaced apart from, and surrounds at least a portion of, the spherical stator 302. The armature 304, which includes an inner surface 314 and an outer surface 316, is coupled to the user interface 102 and to the gimbal assembly 112, and is mounted such that it is movable relative to the spherical stator 302. Preferably, the armature 304 is mounted such that it is movable, relative to the spherical stator 302, about two of the axes of symmetry 308. As a result, the user interface 102, which may be coupled to the outer surface 316 of the armature 304, may receive force feedback (e.g., haptic feedback) from, or be moved to a desired position by, the armature 304.

The magnets 306 are coupled to, and extend inwardly from, the inner surface 314 of the armature 304, and are spaced apart from the spherical stator 302. In the depicted embodiment, as shown more clearly in FIG. 3, the spherical motor 108 includes a plurality of magnets 306. In the depicted embodiment, the spherical motor 108 includes a pair of magnets—a first magnet 306-1 and a second magnet 306-2. It will be appreciated, however, that in other embodiments more than two magnets 306 may be used. It will additionally be appreciated that the magnets 306 may be variously shaped and dimensioned. For example, in the depicted embodiment the magnets 306 are generally arc-shaped, but in other embodiments the magnets 306 may be semi-spherically shaped, or any one of numerous other shapes if needed or desired. It will additionally be appreciated that the arc length of the magnets 306 may be varied, and that the magnets 306 may be permanent magnets or, if needed or desired, electromagnets.

Regardless of the shape and dimensions, however, the magnets 306 are preferably arranged such that the polarity of the first magnet 306-1 relative to the spherical stator 302 is opposite to the polarity of the second magnet 306-2. For example, in the embodiment depicted in FIG. 3, the north pole (N) of the first magnet 306-1 is disposed closer to the spherical stator 302, whereas the south pole (S) of the second magnet 306-2 is disposed closer to the spherical stator 302.

Figure 3:
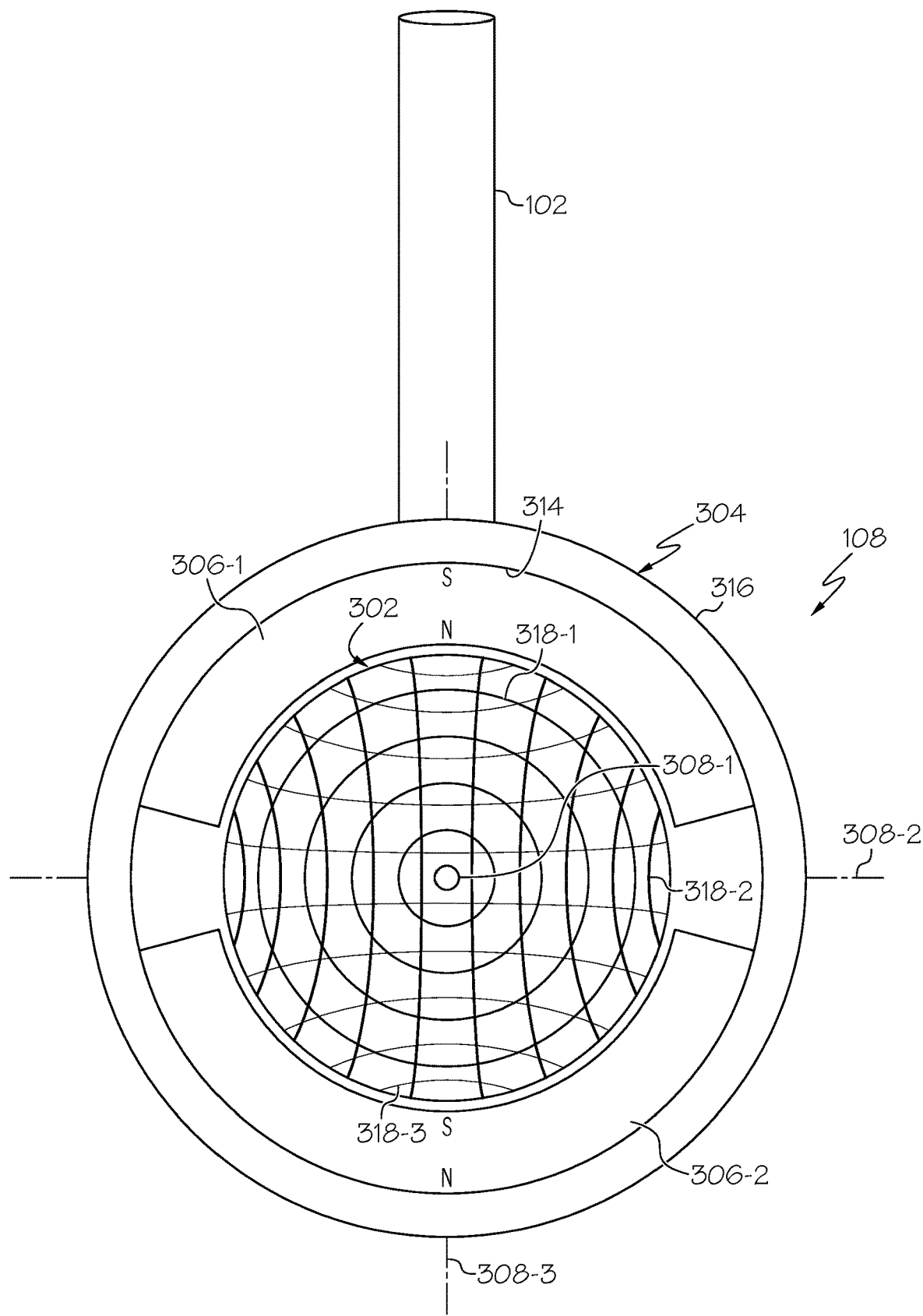
FIG. 3 depicts a simplified cross section view of one embodiment of a spherical motor that may be used to implement the system of FIG. 1.

As FIG. 3 also depicts, the spherical stator 302 has a plurality of coils 318 wound thereon. In the depicted embodiment, these include a first coil 318-1, a second coil 318-2, and a third coil 318-3. It will be appreciated, however, that in some embodiments the spherical motor 108 may be implemented with only two coils instead of three. The first coil 318-1 is wound on the spherical stator 302 about the first axis of symmetry 308-1, the second coil 318-2 is wound on the spherical stator 302 about the second axis of symmetry 308-2, and the third coil 318-3, when included, is wound on the spherical stator 302 about the third axis of symmetry 308-3. It should be noted that a sphere has an infinite number of axes of symmetry. Thus, the first, second, and third axes of symmetry 308-1, 308-2, 308-3, could be any one of these axes of symmetry, so long as all three axes of symmetry are perpendicular to each other.

The configuration of the magnets 306 and coils 318 is such that, when an electrical current is supplied to one or more of the coils 318, a Lorentz force is generated between the energized coil(s) 318 and the magnets 306. This in turn generates a torque about one or more of the axes of symmetry 308. As may be appreciated, the magnitude of the torque that is generated about the one or more axes of symmetry 308, and thus the resistive feedback force on the user interface 102, is proportional to the magnitude of the current flow in the coil(s) 318. As may additionally be appreciated, the direction of the generated torque is based on the direction of the current flow in the coil(s) 318.

Figure 4:
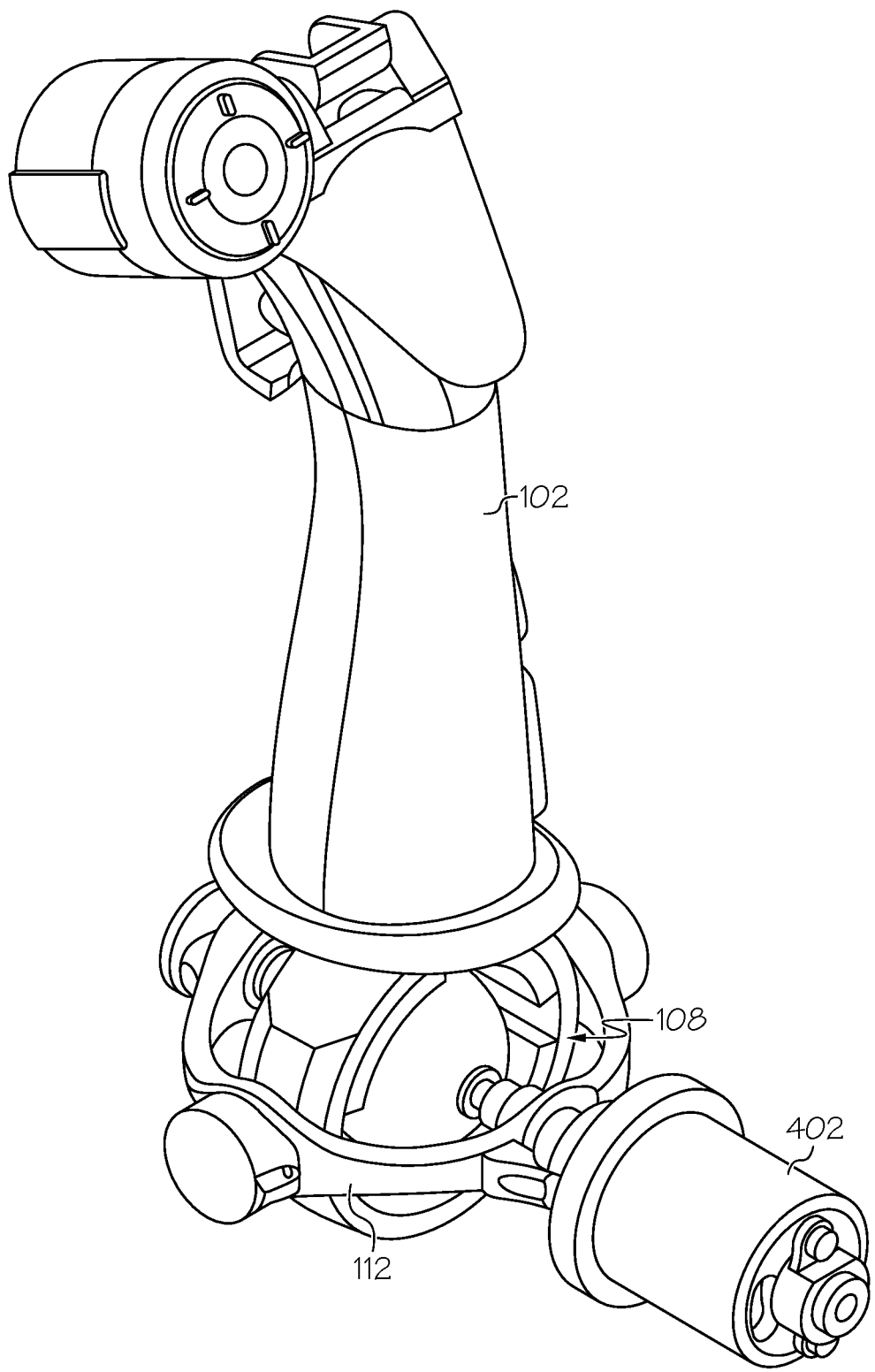
FIG. 4 depicts one embodiment of a physical implementation of a user interface.

Before proceeding further, it is noted that user interface 102 may be implemented according to any one of numerous configurations. In one embodiment, which is depicted in FIG. 4, the user interface 102 is implemented as an active side stick for an aircraft and is preferably dimensioned to be grasped by a hand. The embodiment depicted in FIG. 4 also illustrates one example physical implementation of the gimbal assembly 104 and the spherical motor 108. A housing 402 is also depicted in FIG. 4. The housing 402 preferably has at least the pitch angle sensor 104, the roll angle sensor 106, and the control circuit 110 housed therein. It may also have other sensors not yet described, such as current sensors, housed therein.

Returning now to FIG. 1, the control circuit 110 is coupled to receive the pitch angle signal and the roll angle signal from the pitch angle sensor 104 and the roll angle sensor 106, respectively. The control circuit 110 is operable, in response to at least these signals, to determine the polar angle ($\theta$) and the azimuthal angle ($\varphi$) of the user interface 102 relative to the origin 109. The control circuit 110 is further operable, based on these determinations, to supply current to the first 318-1, second 318-2, and third 318-3 coils. More specifically, the control circuit 110 supplies current to the first coil 318-1 that is equal to $I_0 * \sin(\theta) * \cos(\varphi)$, supplies current to the second coil 318-2 that is equal to $I_0 * \sin(\theta) * \sin(\varphi)$, and supplies current to the third coil 318-3 that is equal to $I_0 * \sin(\theta)$.

It is noted that $I_0$ represents a current vector magnitude value. The current vector magnitude value ($I_0$) may be stored in memory 114 in the control circuit 110 or it may be supplied to the control circuit 110 from an external system. The current vector magnitude ($I_0$) may a fixed value or it may be a variable value, which may be varied manually or based on one or more signals supplied from one or more external systems. As may be appreciated, for given movements of user interface 102, varying the value of current vector magnitude ($I_0$) will vary the feedback force on the user interface 102. Thus, the control circuit 110 may be configured to generate a plurality of spherical resistive feedback force envelopes, if needed or desired.

Depending upon the control scheme implemented in the control circuit 110, the system 100 may additionally include a plurality of current sensors. For example, the system 100 may include a first current sensor 126, a second current sensor 128, and a third current sensor 132. The first current sensor 126, when included, is operable to sense the magnitude and direction of current flow in the first coil 318-1 and supply a first current signal representative thereof to the control circuit 110. The second current sensor 128, when included, is operable to sense the magnitude and direction of current flow in the second coil 318-2 and supply a second current signal representative thereof to the control circuit 110. And the third current sensor 132, when included, is operable to sense the magnitude and direction of current flow in the third coil 318-3 and supply a third current signal representative thereof to the control circuit 110. It will be appreciated that the current sensors 126, 128, 132 may be implemented using any one of numerous known types of current sensors. Some non-limiting examples include any one of numerous types of FET-based sensors, low-pass filter based average sensors, resistor-potential-drop sensors, and magnetic/inductance-based sensors, just to name a few. It will additionally be appreciated that the current sensors 126, 128, 132, while located in the control circuit in FIG. 1, may instead be located at or near the spherical motor 108.

One end-use environment in which it may be desirable to vary the value of the current vector magnitude ($I_0$) is in an aircraft environment, in which the user interface 102, such as the one depicted in FIG. 4, is implemented as an active side stick. In such end-use environments, the control circuit 110 is further configured, upon receipt of the pitch angle signal and the roll angle signal, to supply flight control surface position signals 116 to, for example, a flight control system 118. The flight control system 118, in turn supplies power to appropriate flight control surface actuators 120, to thereby move the appropriate primary flight control surfaces (not illustrated) to the appropriate positions, and thereby implement a desired maneuver. In other embodiments, the flight control system 118 may receive the pitch angle signal and the roll angle signal directly from the pitch angle and roll angle sensors 104, 106 and, in response, supply power to the appropriate flight control surface actuators 120, to move the appropriate primary flight control surfaces to the appropriate positions.

In some embodiments, it may be desirable to vary the magnitude of the resistive feedback force supplied to the user interface 102 based on certain aircraft operating conditions. Thus, as FIG. 1 additionally depicts, the control circuit 110 may also receive data representative of aircraft operating conditions 122. The control circuit 110, in response to these data, varies the value of the current vector magnitude ($I_0$). Although the specific number and type of aircraft operating conditions may vary, in the depicted embodiment, the data 122 may be representative of aircraft speed, aircraft altitude, aircraft attitude, aircraft angle-of-attack, flight control surface position, and flight control surface slew rate, just to name a few. In addition, the data 122 may also include data representative of aircraft operating envelope. It will be appreciated that these data 122 may be supplied from various sensors and systems that comprise the aircraft avionics 124.

The control circuit 110 may also be configured, in some embodiments, to vary the value of the current vector magnitude ($I_0$) based on the position (i.e., the polar angle ($\theta$) and the azimuthal angle ($\varphi$)) of the user interface 102 and/or the slew rate of the user interface 102. The control circuit 110 may also be configured, in some embodiments, to restrict movement of the user interface 102 to one or both of a predetermined polar angle ($\theta$) and the azimuthal angle ($\varphi$).

Many aircraft include an autopilot system 134. As is generally known, the autopilot system 134, when included, supplies autoflight control commands that control the movement of the aircraft without the pilot directly manipulating the controls (i.e., the user interface 102). It is desirable, when the autopilot system 134 is engaged, that the user interface 102 (e.g., side stick) be moved to reflect the maneuvers being commanded by the autopilot system 134. Thus, in the depicted embodiment, when the aircraft includes an autopilot system 134, it is placed in operable communication with the control circuit 110, and the autopilot system 134 supplies data representative of the aircraft autoflight control commands to the control circuit 110. The control circuit 110, upon receipt of the data representative of aircraft autoflight control commands, supplies current to the first 318-1, second 318-2, and third 318-3 coils that cause the user interface 102 to move to positions that reflect the aircraft autoflight control commands.

Figure 5:
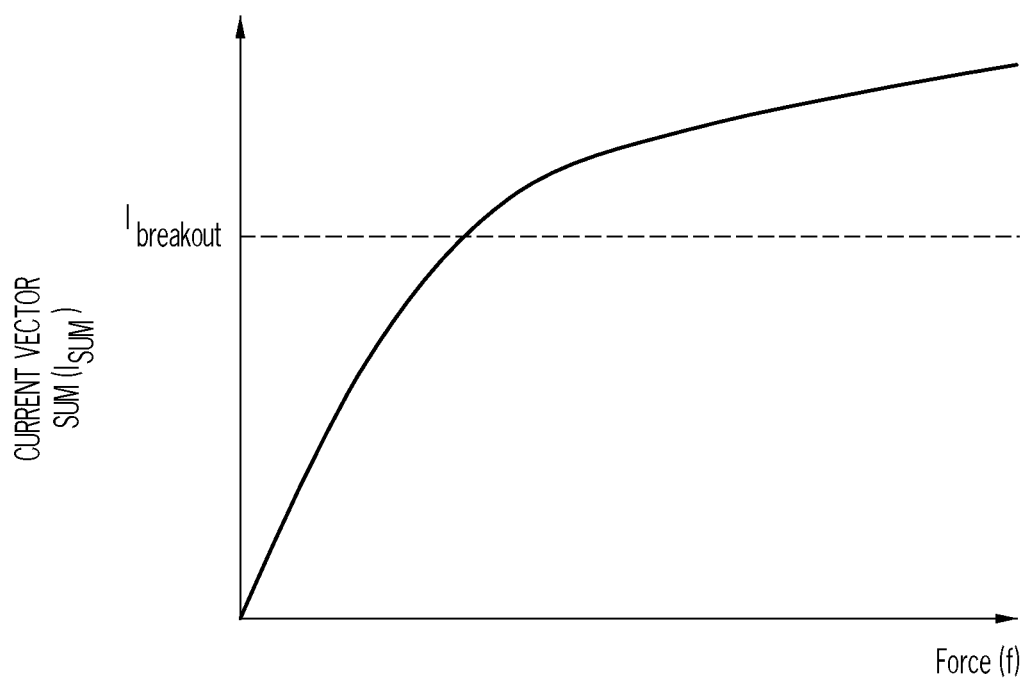
FIG. 5 graphically depicts a breakout force function that may be implemented in the system of FIG. 1.

When the autopilot system 134 is engaged, there may be times when the pilot will need (or want) to override the autopilot system 134 and take manual control of the aircraft. To ensure that the pilot's action to override the autopilot system 134 is intentional, the system 100 implements a breakout force. More specifically, when the control circuit 110 determines that the pilot is applying a force to the user interface 102 (e.g., side stick) that exceeds a predetermined force, it supplies a signal to the autopilot system 134. The autopilot system 134, upon receipt of the signal, will disengage and flight control and stop supplying the data representative of aircraft autoflight control commands to the control circuit 110. As a result, flight control is returned to manual control by the pilot manipulating the user interface 102. To implement this, the control circuit 110 is configured, based on the currents sensed by the first, second, and third current sensors 126, 128, 132, to determine if the vector sum of the currents supplied to the first, second, and third coils 318-1, 318-2, 318-3 ($I_{sum}$), exceeds a predetermined current magnitude ($I_{breakout}$). This functionality, which is graphically depicted in FIG. 5, prevents unintentional movement of the user interface 102 in the event the pilot were to accidentally nudge or brush the user interface 102.

The active human-machine interface system described herein is moveable about at least two perpendicular axes and is less costly, lower in weight, and exhibits a smaller space envelope, as compared to known human-machine interfaces.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An active human-machine interface feedback system, comprising:
   a user interface adapted to receive user input and configured, upon receipt of the user input, to move, about one or both of a pitch axis and a roll axis, to a user interface position, the user interface position having one or both of a pitch angle component and a roll angle component, wherein the pitch axis and the roll axis are disposed perpendicular to each other and intersect at an origin;
   a pitch angle sensor coupled to the user interface and configured to sense the pitch angle component of the user interface position, the pitch angle sensor further configured to supply a pitch angle signal representative of the user interface pitch angle component;
   a roll angle sensor coupled to the user interface and configured to sense the roll angle component of the user interface position, the roll angle sensor further configured to supply a roll angle signal representative of the user interface roll angle component;
   a spherical motor coupled to the user interface and symmetrically disposed about the origin, the spherical motor including an armature, a spherical stator, a first coil, a second coil, and a third coil, the armature coupled to the user interface, the spherical stator having a first axis of symmetry, a second axis of symmetry, a third axis of symmetry, the first, second, and third axes of symmetry disposed perpendicular to each other, the first coil, the second coil, and the third coil wound on the spherical stator about the first axis of symmetry, the second axis of symmetry, and the third axis of symmetry, respectively; and
   a control circuit coupled to receive the pitch angle signal and the roll angle signal and operable, in response to at least these signals, to:
   determine a polar angle ($\theta$) of the user interface relative to the origin,
   determine an azimuthal angle ($\varphi$) of the user interface relative to the origin,
   supply current to the first coil that is equal to $I_0*\sin(\theta)*\cos(\varphi)$,
   supply current to the second coil that is equal to $I_0*\sin(\theta)*\sin(\varphi)$, and
   supply current to the third coil that is equal to $I_0*\sin(\theta)$, wherein $I_0$ is a current vector magnitude value.

2. The system of claim 1, wherein the control circuit is further configured to vary the current vector magnitude value ($I_0$), to thereby vary a resistive feedback force on the user interface.

3. The system of claim 2, wherein the control circuit varies the current vector magnitude value ($I_0$) in response to aircraft operating conditions.

4. The system of claim 3, further comprising:
   an aircraft avionics system in operable communication with the control circuit, the aircraft avionics system configured to supply data representative of the aircraft operating conditions to the control circuit.

5. The system of claim 2, wherein the control circuit varies the current vector magnitude value ($I_0$) in response to the polar angle ($\theta$) and the azimuthal angle ($\varphi$).

6. The system of claim 2, wherein the control circuit is further configured to restrict movement of the side stick to one or both of a predetermined polar angle ($\theta$) and the azimuthal angle ($\varphi$).

7. The system of claim 1, further comprising:
   an aircraft autopilot system in operable communication with the control circuit, the aircraft autopilot system configured to supply data representative of aircraft autoflight control commands to the control circuit,
   wherein the control circuit is further configured, upon receipt of the data representative of aircraft autoflight control commands, to supply current to the first, second, and third coils that cause the user interface to move to positions that represent the aircraft autoflight control commands.

8. The system of claim 7, further comprising:
   a first current sensor operable to sense a magnitude and direction of current flow in the first coil and supply a first current signal representative thereof to the control circuit;
   a second current sensor operable to sense a magnitude and direction of current flow in the second coil and supply a second current signal representative thereof to the control circuit; and
   a third current sensor operable to sense a magnitude and direction of current flow in the third coil and supply a third current signal representative thereof to the control circuit.

9. The system of claim 8, wherein the control circuit is further configured to:
   determine a vector sum of current flow in the first, second, and third coils;
   compare the vector sum to a predetermined breakout current; and
   supply a disengage signal to the aircraft autopilot system when the vector sum exceeds the predetermined breakout current.

10. The system of claim 9, wherein the autopilot system is configured, upon receipt of the disengage signal, to disengage and stop supplying the data representative of aircraft autoflight control commands to the control circuit.

11. An active human-machine interface haptic feedback system, comprising:
    a user interface adapted to receive user input and configured, upon receipt of the user input, to move, about one or both of a pitch axis and a roll axis, to a user interface position, the user interface position having one or both of a pitch angle component and a roll angle component, wherein the pitch axis and the roll axis are disposed perpendicular to each other and intersect at an origin;
    a pitch angle sensor coupled to, and configured to sense the pitch angle component of, the user interface position, the pitch angle sensor further configured to supply a pitch angle signal representative of the user interface pitch angle component;
    a roll angle sensor coupled to, and configured to sense the roll angle component of, the user interface position, the roll angle sensor further configured to supply a roll angle signal representative of the user interface roll angle component;
    a spherical motor coupled to the user interface and symmetrically disposed about the origin, the spherical motor including an armature, a spherical stator, a first coil, a second coil, and a third coil, the armature coupled to the user interface, the spherical stator having a first axis of symmetry, a second axis of symmetry, a third axis of symmetry, the first, second, and third axes of symmetry disposed perpendicular to each other, the first coil, the second coil, and the third coil wound on the spherical stator about the first axis of symmetry, the second axis of symmetry, and the third axis of symmetry, respectively; and a control circuit coupled to receive the pitch angle signal, the roll angle signal, and data representative of aircraft operable, in response to at least these signals, to:
determine a polar angle ($\theta$) of the user interface relative to the origin,
determine an azimuthal angle ($\varphi$) of the user interface relative to the origin,
supply current to the first coil that is equal to $I_0*\sin(\theta)*\cos(\varphi)$,
supply current to the second coil that is equal to $I_0*\sin(\theta)*\sin(\varphi)$, and
supply current to the third coil that is equal to $I_0*\sin(\theta)$,
wherein $I_0$ is a variable current vector magnitude value.

12. The system of claim 11, wherein the control circuit is further configured to vary the current vector magnitude value ($I_0$) in response to the polar angle ($\theta$) and the azimuthal angle ($\varphi$).

13. The system of claim 11, wherein the control circuit is further configured to vary the current vector magnitude value ($I_0$) in response to aircraft characteristics.

14. The system of claim 13, further comprising:
an aircraft avionics system in operable communication with the control circuit, the aircraft avionics system configured to supply data representative of the aircraft characteristics to the control circuit.

15. The system of claim 11, wherein the control circuit is further configured to restrict movement of the user interface to one or both of a predetermined polar angle ($\theta$) and the azimuthal angle ($\varphi$).

16. The system of claim 11, further comprising:
an aircraft autopilot system in operable communication with the control circuit, the aircraft autopilot system configured to supply data representative of aircraft autoflight control commands to the control circuit,
wherein the control circuit is further configured, upon receipt of the data representative of aircraft autoflight control commands, to supply current to the first, second, and third coils that cause the user interface to move to positions that represent the aircraft autoflight control commands.

17. The system of claim 16, further comprising:
a first current sensor operable to sense a magnitude and direction of current flow in the first coil and supply a first current signal representative thereof to the control circuit;
a second current sensor operable to sense a magnitude and direction of current flow in the second coil and supply a second current signal representative thereof to the control circuit; and
a third current sensor operable to sense a magnitude and direction of current flow in the third coil and supply a third current signal representative thereof to the control circuit.

18. The system of claim 17, wherein the control circuit is further configured to:
determine a vector sum of current flow in the first, second, and third coils;
compare the vector sum to a predetermined breakout current; and
supply a disengage signal to the aircraft autopilot system when the vector sum exceeds the predetermined breakout current.

19. The system of claim 18, wherein the autopilot system is configured, upon receipt of the disengage signal, to disengage and stop supplying the data representative of aircraft autoflight control commands to the control circuit.

20. An active human-machine interface haptic feedback system, comprising:
a user interface adapted to receive user input and configured, upon receipt of the user input, to move, about one or both of a pitch axis and a roll axis, to a user interface position, the user interface position having one or both of a pitch angle component and a roll angle component, wherein the pitch axis and the roll axis are disposed perpendicular to each other and intersect at an origin;
a pitch angle sensor coupled to, and configured to sense the pitch angle component of, the user interface position, the pitch angle sensor further configured to supply a pitch angle signal representative of the user interface pitch angle component;
a roll angle sensor coupled to, and configured to sense the roll angle component of, the user interface position, the roll angle sensor further configured to supply a roll angle signal representative of the user interface roll angle component;
a spherical motor coupled to the user interface and symmetrically disposed about the origin, the spherical motor including an armature, a spherical stator, a first coil, a second coil, and a third coil, the armature coupled to the user interface, the spherical stator having a first axis of symmetry, a second axis of symmetry, a third axis of symmetry, the first, second, and third axes of symmetry disposed perpendicular to each other, the first coil, the second coil, and the third coil wound on the spherical stator about the first axis of symmetry, the second axis of symmetry, and the third axis of symmetry, respectively; and
a control circuit coupled to receive the pitch angle signal, the roll angle signal, and data representative of aircraft operable, in response to at least these signals, to:
determine a polar angle ($\theta$) of the user interface relative to the origin,
determine an azimuthal angle ($\varphi$) of the user interface relative to the origin,
supply current to the first coil that is equal to $I_0*\sin(\theta)*\cos(\varphi)$,
supply current to the second coil that is equal to $I_0*\sin(\theta)*\sin(\varphi)$, and
supply current to the third coil that is equal to $I_0*\sin(\theta)$,
wherein:
$I_0$ is a variable current vector magnitude value, and
the control circuit is further configured to vary the current vector magnitude value ($I_0$) in response to the polar angle ($\theta$) and the azimuthal angle ($\varphi$).

* * * * *